(12) United States Patent
Zabinski

(10) Patent No.: US 6,429,728 B1
(45) Date of Patent: Aug. 6, 2002

(54) COMPONENT ASSISTED POWER REGULATION

(75) Inventor: Anthony E. Zabinski, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/670,750

(22) Filed: Sep. 27, 2000

(51) Int. Cl.[7] ............................. G05F 1/10; G05F 3/02
(52) U.S. Cl. ..................... 327/540; 327/328; 323/266
(58) Field of Search ....................... 327/327, 328, 327/540, 541, 543; 323/908, 226, 299, 303

(56) References Cited

U.S. PATENT DOCUMENTS

| 5,790,526 A | * | 8/1998 | Kniess et al. ............... 370/257 |
| 5,986,902 A | * | 11/1999 | Brkovic et al. ............... 363/50 |
| 6,023,190 A | * | 2/2000 | Wada .......................... 327/540 |

* cited by examiner

Primary Examiner—Terry D. Cunningham
Assistant Examiner—Quan Tra
(74) Attorney, Agent, or Firm—Trop, Pruner & Hu, P.C.

(57) ABSTRACT

A technique includes providing a regulated voltage to a voltage supply plane of a component. The voltage causes the component to draw a current. The current is monitored, and the voltage supply plane is selectively coupled to ground to regulate a rate at which the current changes.

33 Claims, 4 Drawing Sheets

COMPONENT ASSISTED POWER REGULATION

BACKGROUND

The invention generally relates to component assisted power regulation.

A typical computer system includes at least one voltage regulator (a switching regulator, for example) that provides and regulates various supply voltages that are used by and power the components of the computer system. As examples, the computer system may provide and regulate supply voltages for 5 volt (V), 3.3 V, 2.5 V, 1.8 V and 1.5V power planes of the computer system.

A particular voltage regulator may regulate a given supply voltage within tolerance levels set at several tens of millivolts about the nominal voltage while delivering a variable output current that may exceed 100 amps. Ideally, the voltage regulator should quickly respond to rapid changes in the output current to maintain tight regulation of the supply voltage. However, it is quite possible that the output current may change at a rate faster than the rate at which the regulator can maintain regulation of the supply voltage. As a result, the supply voltage may momentarily fall outside of tolerance levels. Unfortunately, a momentary loss of regulation by the voltage regulator may detrimentally affect the performance of the computer, cause computational errors in the computer system, cause memory losses in the computer system and may even damage components of the computer system, as just a few examples.

For purposes of maintaining tight regulation of the supply voltages, a typical computer system may include complex voltage regulation circuitry, thereby increasing the cost of the computer system. Alternatively, large and/or many capacitors may be coupled to the supply voltage planes to maintain adequate regulation during rapid current changes, and thus, a considerable amount of space on the motherboard may be devoted to these capacitors, thereby increasing the cost of the computer system.

Thus, there is a continuing need for an arrangement that addresses one or more of the problems that are stated above.

DETAILED DESCRIPTION

Figure 1:
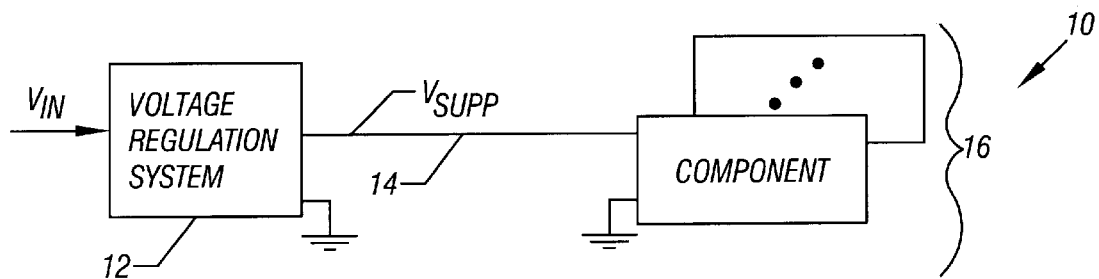
FIG. 1 is a schematic diagram of a system according to an embodiment of the invention.

Referring to FIG. 1, an embodiment 10 of a system in accordance with the invention includes a voltage regulation system 12 that may provide and regulate different supply voltages to power consuming components 16 of the system 10. For example, the voltage regulation system 12 may provide a supply voltage (called $V_{SUPP}$) to a supply voltage plane (also called a "rail") 14 that communicates the Vsupp voltage to the power consuming components 16 via the supply voltage plane 14. The voltage regulation system 12 regulates the $V_{SUPP}$ voltage within given predefined tolerance levels while providing a supply current (via the supply voltage plane 14) that is collectively demanded by the power consuming components 16. In some embodiments of the invention, the voltage regulation system 12 may include a switching voltage regulator that provides the $V_{SUPP}$ voltage. As described below, semiconductor dies of the power consuming components 16 may be integral parts of the power subsystem.

During its course of operation, a given power consuming component 16 may conduct an ever-changing current from the supply voltage plane 14 due to the various functions being performed by the component 16. It is possible that the current that is conducted by the power consuming component 16 may change at a rate greater than a rate at which the voltage regulation system 12 may respond, i.e., the rate of the component's current increase or decrease may be greater than the regulation rate. Due to the difference in these rates, the change in current that is conducted by the component 16 may be viewed as approximating a step function.

It is possible that the voltage regulation system 12 may momentarily loose tight regulation of the $V_{SUPP}$ supply voltage should a rapid change in the supply current occur. However, unlike conventional systems, the power consuming components 16 assist the voltage regulation system 12 by preventing rapid changes in the supply current. In this manner, each power consuming component 16 monitors the level of current that the power consuming component 16 conducts from the supply voltage plane 14. If the level of this current is below a predefined threshold, the component 16 activates an internal switch to create a current path to ground to increase the current level that the component 16 conducts from the supply voltage plane 14. Conversely, if the component 16 is consuming a large amount of current, the internal switch is deactivated, thereby reducing the deviation that is seen by the power subsystem. Thus, the component 16 establishes a minimum current level that the component 16 conducts from the voltage regulation system 12. As described below, in some embodiments of the invention, at least one of the components 16 may be a semiconductor package, often called a "semiconductor chip." Referring to FIG. 2, more specifically, in some embodiments of the invention, each component 16 may include an internal supply voltage plane 22 (that is coupled to the supply voltage plane 14 and communicates the $V_{SUPP}$ supply voltage inside the component 16) and an internal ground plane 24, both of which are coupled to power consuming circuitry 34 of the component. As an example, the power consuming circuitry 34 may be circuitry 34 that forms a microprocessor. Because it is possible that a current (called $I_2$) that is drawn by the circuitry 34 may rapidly change at a rate faster than the rate at which the voltage regulation system 12 changes the current (called $I_1$) that is received by the component 16, the component 16 includes a switch 29 that is selectively coupled between the voltage supply plane 22 and the ground plane 24.

In this manner, the switch 29 shunts current (called $I_3$) from the voltage supply plane 22 to the ground plane 24 when the $I_2$ current decreases below a predetermined minimum threshold current level. Thus, the switch 29 establishes the minimum level of the $I_1$ current to limit the rate at which the $I_1$ current may change. For example, the $I_2$ current may rapidly decrease to cause the $I_1$ current to decrease from a beginning current level to an ending current level. Because the switch 29 establishes the minimum of this ending current level, the negative change in the $I_1$ current is limited, thereby limiting $I_1$ current's rate of negative change. As another example, the $I_2$ current may rapidly increase to cause the $I_1$ current to increase from a beginning current level to an ending current level. Because the switch 29 establishes the minimum of the beginning current level, the positive change in the $I_1$ current is limited, thereby limiting the $I_1$ current's rate of positive change.

Figure 2:
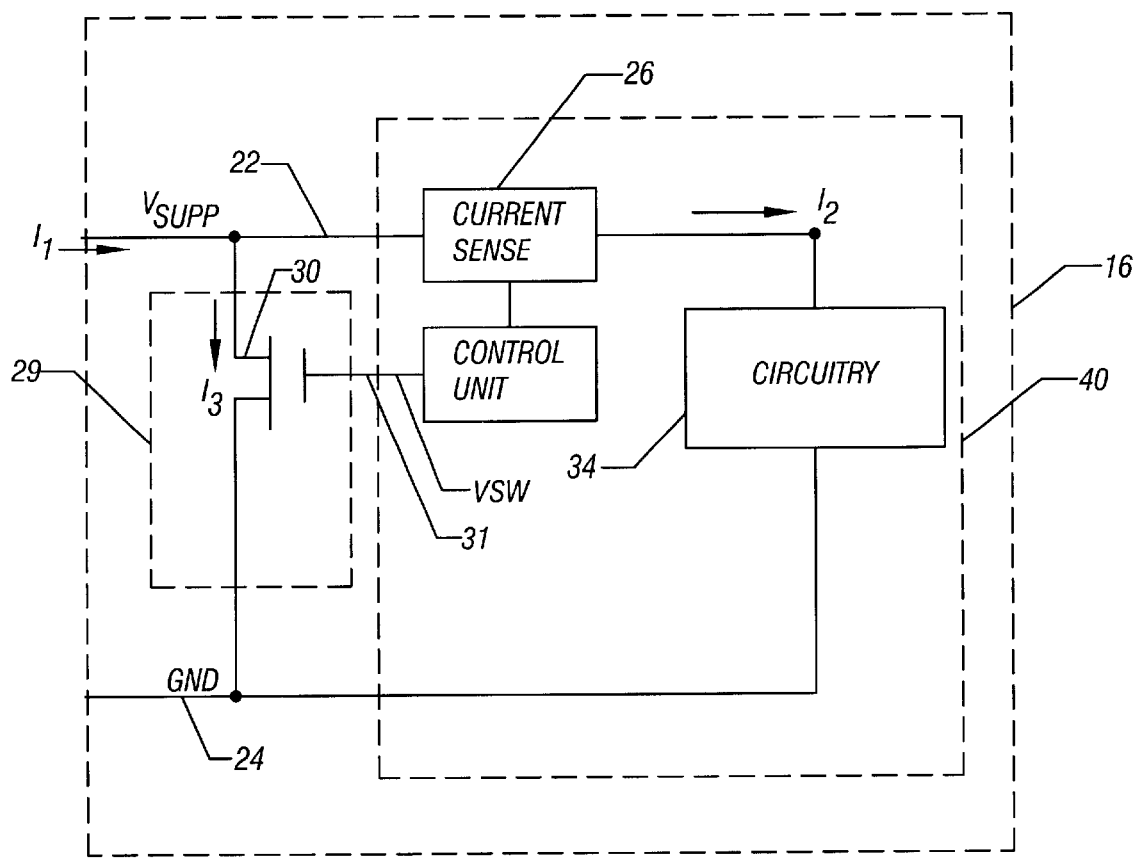
FIGS. 2 and 5 are schematic diagrams of a circuit of a component of the system according to embodiments of the invention.

As depicted in FIG. 2, the $I_1$ current is equal to the sum of the $I_2$ and $I_3$ currents. When the switch 29 is open, the $I_3$ current component is removed, and the $I_1$ and $I_2$ currents are equal. However, when the $I_1$ current decreases below a minimum threshold current level, the switch 29 conducts to maintain the overall minimum of the $I_1$ current.

For purposes of determining when the $I_1$ (or $I_2$) current decreases below the minimum threshold current level, the component 16 may include a current sensing element 26 to indicate the $I_2$ current. In some embodiments of the invention, the control unit 28 controls the operation of the switch 29 (i.e., closes or opens the switch 29) based on the indication of the $I_2$ current that is furnished by the current sensing element 26. In this manner, when the $I_2$ current is above the minimum threshold current level, the control unit 28 causes the switch 29 to be open, or not conduct. However, when the control unit 28 determines that the level of the $I_2$ current is below the minimum threshold current level, the control unit 28 communicates with the switch 29 to close the switch 29 to add the $I_3$ component to the $I_2$ component to boost the level of the $I_1$ current. When the $I_2$ current increases above a higher predetermined threshold value, then the control unit 28 opens the switch 29.

The control unit 28 may furnish a switching signal (called $V_{SW}$) to control operation of the switch 29. The control unit 28 drives the $V_{SW}$ voltage high to close the switch 29 and drives the $V_{SW}$ voltage low to open the switch 29.

Figure 6:
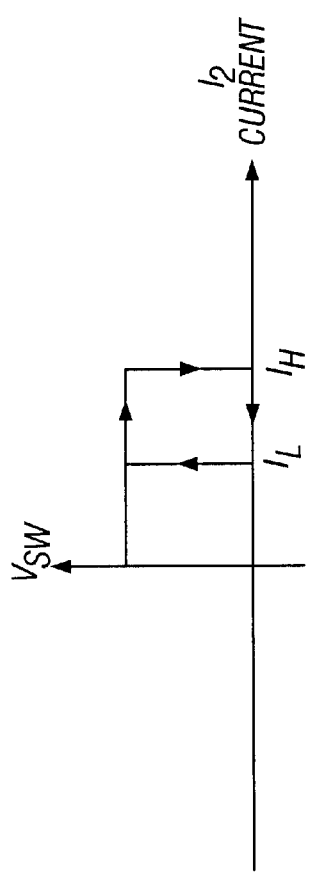
FIG. 6 is a plot of a switching voltage versus a supply current according to an embodiment of the invention.

In some embodiments of the invention, the control unit 28 may implement a hysteresis-type control loop, as depicted in FIG. 6. In this manner, when the switch 29 is open (and the $V_{SW}$ voltage is low), the control circuit 28 monitors the $I_2$ current to determine whether the $I_2$ current is below a predetermined minimum current threshold level called $I_L$. If this condition occurs, the control circuit 28 asserts the $V_{SW}$ voltage to close the switch 29. Once the switch 29 is closed, the control circuit 28 monitors the $I_2$ current to determine whether the $I_2$ current exceeds a predetermined maximum current threshold called $I_H$, a threshold that is higher than the $I_L$ threshold. When the $I_2$ current surpasses the $I_H$ threshold, the control circuit 28 drives the $V_{SW}$ voltage low to open the switch 29.

In some embodiments of the invention, the current sensing circuit 26 may include a fabricated resistor that has a small resistance for purposes of indicating the $I_2$ current. In other embodiments of the invention, the current sensing circuit 26 may not include a fabricated resistor. Instead, the current sensing circuit 26 may include conductive lines that are coupled to different points of the supply voltage power plane 22. In this manner, the inherent resistance in the power plane 22 between the two points produces a voltage that indicates the current. Other current sensing circuits 26 may be used in other embodiments of the invention. For example, the current sensing circuit 26 may include a transistor that indicates the current. Other arrangements are possible.

As an example, in some embodiments of the invention, the control circuit 28 may include a comparator that furnishes the $V_{SW}$ signal at its output terminal in response to the comparison of the current level that is indicated by the current sensing circuit 26 to a predetermined minimum threshold current level. In other embodiments of the invention, the control circuit 28 may include a Schmitt trigger circuit, for example that receives an indication of the $I_2$ current from the current sensing circuit 26, furnishes the $V_{SW}$ at its output terminal and establishes the hysteresis that is depicted in FIG. 6.

The switch 29 may include one or more n-channel metal-oxide-semiconductor field-effect-transistors (NMOSFETs), such as the NMOSFET 30 that is depicted in FIG. 2. In this manner, the drain-source path of the NMOSFET 30 is coupled between the supply voltage 22 and ground 24 planes. The gate terminal of the NMOSFET 30 receives the $V_{SW}$ signal. In embodiments of the invention where the switch 29 is formed from multiple NMOSFETs, the drain-source paths of at least some of the other NMOSFET(s) may be coupled in parallel with the NMOSFET 30, and the gate terminal of the other NMOSFET(s) may receive the $V_{SW}$ signal.

Figure 3:
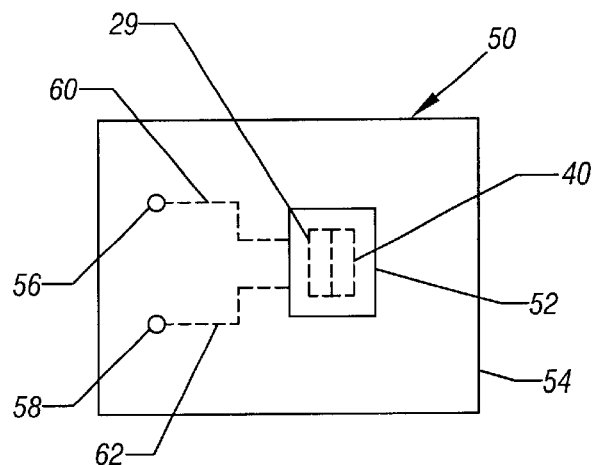
FIGS. 3 and 4 are schematic diagrams of a semiconductor package according to embodiments of the invention.

The component 16 may include a semiconductor package, such as a semiconductor package 50 that is depicted in FIG. 3 (in a top view). The package 50 includes a die 52 on which is fabricated the switch 29 and the remaining circuitry 40 (the current sensing circuit 26, the control unit 28 and the circuitry 34) of the component 16. The die 52 may be mounted on top of a printed circuit board 54, and the bottom of the die 52 may include conductive pads (not shown) that contact conductive lines of the board 54, such as conductive lines 60 and 62 that communicate the supply voltage 22 and ground 24 planes, respectively, to external contacts 56 and 58, respectively, of the package 50. The external contacts 56 and 58 may extend from the bottom of the package 50, for example. Not depicted in FIG. 3 is an encapsulant that covers the above-described members of the package 50, leaving the external contacts 56 and 58 exposed.

Figure 4:
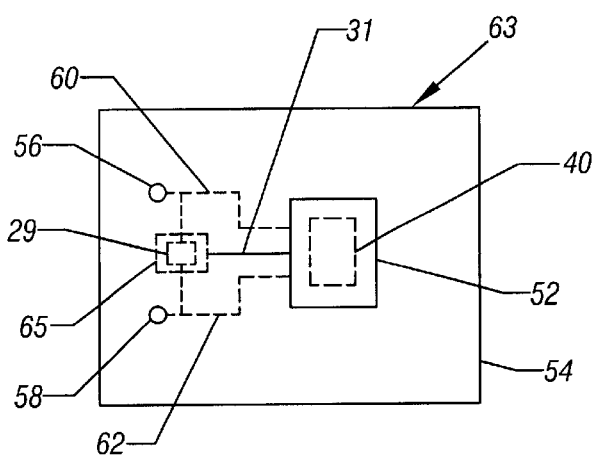

FIG. 4 depicts another semiconductor package 63 that is similar in design to the package 50, except that for the package 63, the switch 29 is located off of the die 52 and is mounted to the board 54. As an example, the switch 29 may include a surface mount device (a surface mount NMOSFET, for example) that is coupled to the conductive lines 60 and 62, as well as coupled to another conductive line 31 that communicates the $V_{SW}$ signal from the control unit 28. As an example, for the package 63, the remaining circuitry 40 may be separate from the switch 29 and fabricated on the die 52. The conductive line 31 communicates the $V_{SW}$ signal from a conductive pad that is located on the bottom side of the die 52 and is electrically coupled to the control unit 28.

Figure 5:
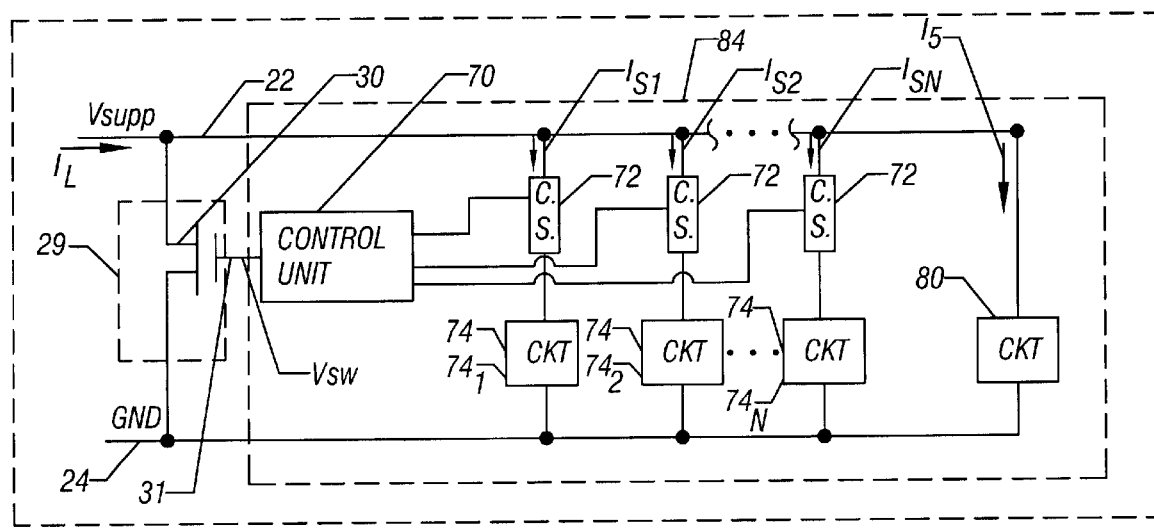

Referring to FIG. 5, in some embodiments of the invention, the circuitry 40 of the component 16 may be replaced by circuitry 84 that has multiple current sensing circuits 72, each of which is coupled between a power consuming circuit 74 (circuits $74_1$, $74_2$, . . . $74_N$, as examples) and the voltage supply plane 22. Each power consuming circuit 74 is also coupled to the ground plane 24. In this manner, each current sensing circuit 72 provides an indication of the current ($I_{S1}$, $I_{S2}$, . . . $I_{SN}$) that is received by the associated power consuming circuit 74. A control unit 70 (that replaces the control unit 28) performs a summation of the $I_{S1}$ to $I_{SN}$ current levels to approximate the total amount of current being drawn by all circuitry of the component and controls operation of the switch 29 based on this approximation. It is noted that the current that is received by additional power consuming circuitry 80 that is coupled between the supply voltage 22 and ground 24 planes is not monitored. Thus, an advantage of this technique is that the current may be sensed at various points of the component 16 to approximate the total current being drawn from the supply voltage plane 22, without directly sensing the total current. As a result, less power may be dissipated.

Figure 7:
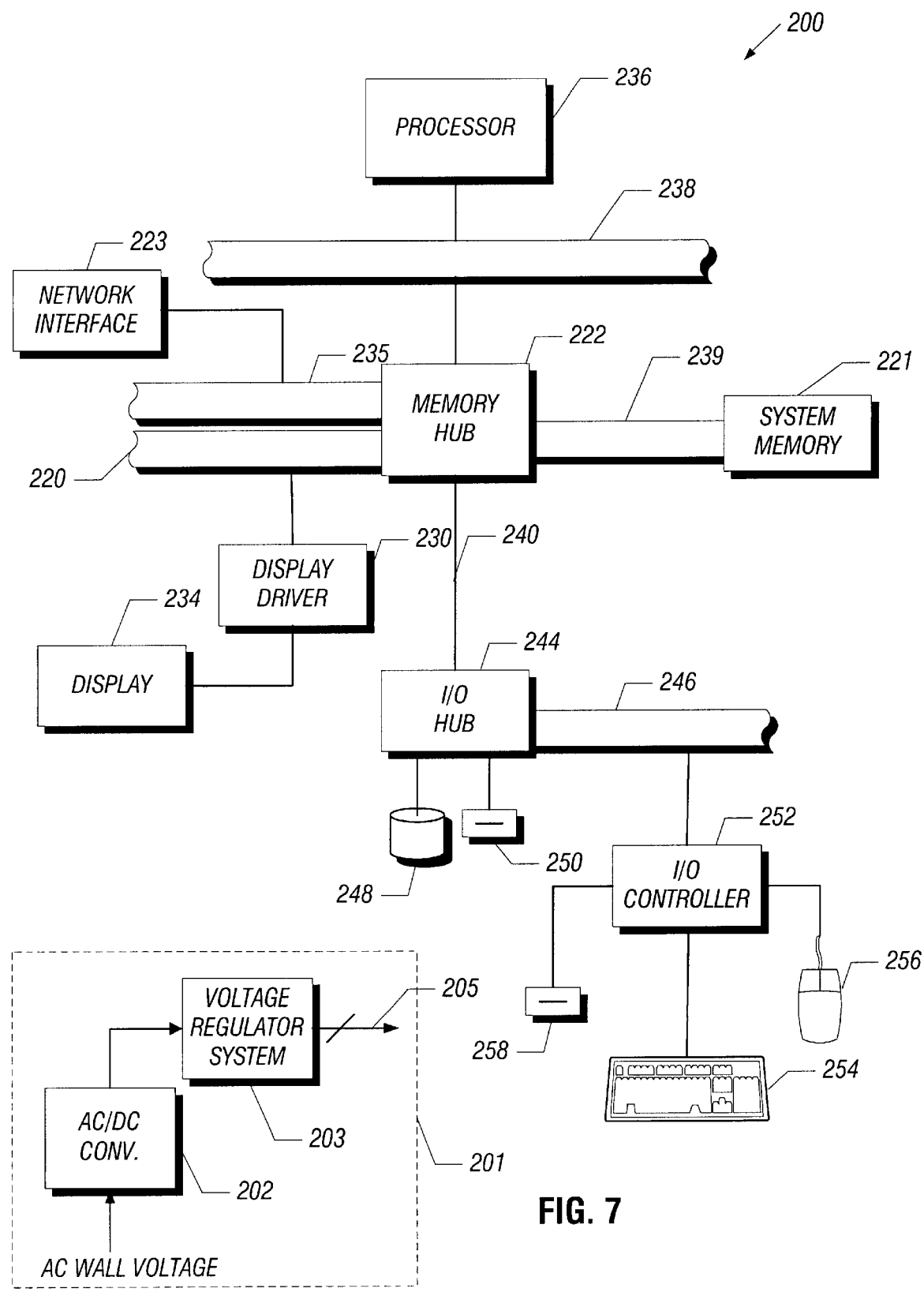

FIG. 7 depicts a computer system 200 having components that may each regulate the minimum current that is conducted by the component, as described above. The computer system 200 may include, in some embodiments of the invention, a power subsystem 201 that provides various regulated DC voltages to the components of the computer system 200. The power subsystem 201 may include, for example, an AC-to-DC converter 202 that converts an AC wall voltage into a DC voltage that is provided to a voltage regulation system 203 that provides (via output lines 207) and regulates the DC voltages that are provided to the components of the computer system 200. As an example of possible components of the computer system the computer system 200 may include a processor 236. In this context, the term "processor" may refer to, as examples, to at least one microcontroller, X86 microprocessor, Advanced RISC Machine (ARM) microprocessor or Pentium microprocessor. Other types of processors are possible and are within the scope of the following claims.

The processor 236 may be coupled to a local bus 238 along with a north bridge, or memory hub 222. The memory hub 222 may represent a collection of semiconductor devices, or "chip set," and provide interfaces to a Peripheral Component Interconnect (PCI) bus 235 and an AGP bus 220. The PCI Specification is available from The PCI Special Interest Group, Portland, Oreg. 97214. The AGP is described in detail in the Accelerated Graphics Port Interface Specification, Revision 1.0, published on Jul. 31, 1996, by Intel Corporation of Santa Clara, Calif.

A display driver 230 may be coupled to the AGP bus 235 and provide signals to drive a display 234. The PCI bus 35 may be coupled to a network interface 223, for example. The memory hub 222 may also provide an interface to a memory bus 239 that is coupled to a system memory 221.

A south bridge, or input/output (I/O) hub 244, is coupled to the memory hub 222 via a hub link 240. The I/O hub 244 provides interfaces for a hard disk drive 248, a CD-ROM drive 250 and an I/O expansion bus 246, as just a few examples. An I/O controller 252 may be coupled to the I/O expansion bus 246 to receive input data from a mouse 256 and a keyboard 254. The I/O controller 52 may also control operations of a floppy disk drive 258.

Figure 8:
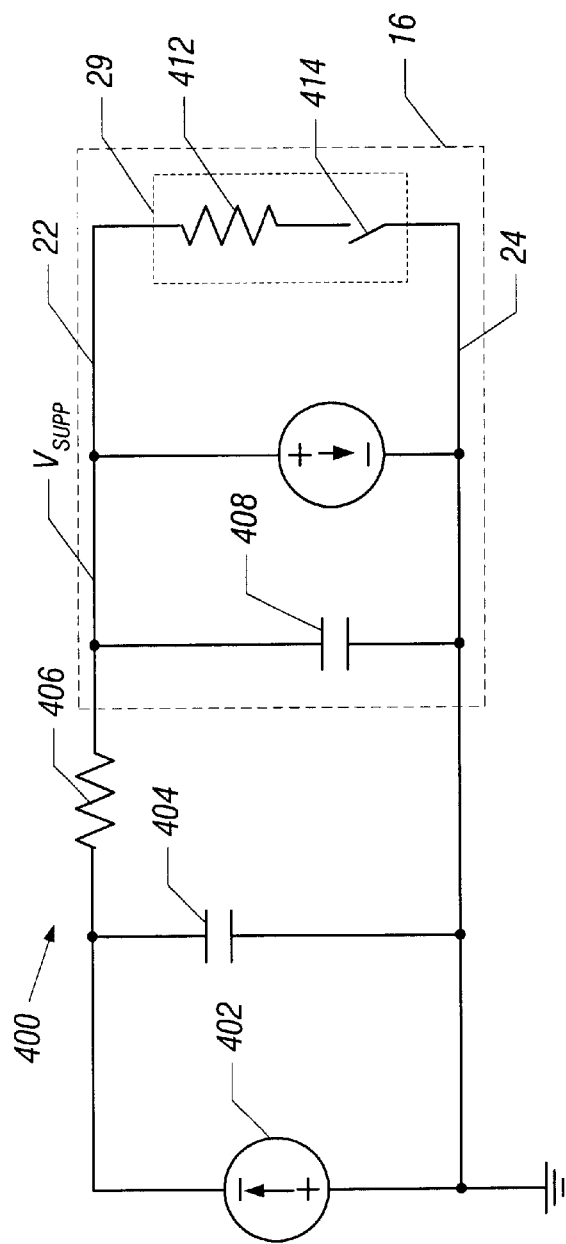
FIGS. 7 and 8 are schematic diagrams of computer systems according to embodiments of the invention.

FIG. 8 depicts a simplified schematic diagram of a computer system 400 illustrating delivery of power to a component 16 of the system 400. A current source 402 of the system 400 represents a switching regulator, as the regulator may be viewed as a current source that regulates the $V_{SUPP}$ voltage at the supply voltage power plane 22 at a load. The current source 402 is in parallel with a capacitor 404 that represents a bulk capacitance located on a motherboard of the computer system 400. A series resistance (represented by a resistor 406) exists between the current source 402 and the supply voltage power plane 22. A capacitor 408 is coupled between the supply voltage 22 and ground 24 planes to represent the capacitance of the die. Because this capacitance only affects high frequencies, its effect is ignored in the simulation below. A current source 410 that is coupled between the supply voltage plane 22 and the ground plane 24 represents the current drawn by the circuitry of the component. The switch 29 is represented by the series combination of an ideal switch 414 (i.e., a switch having no switching losses) and a resistor 412 that are coupled between the supply voltage 22 and ground 24 planes.

The following simulation (a simulation performed with a Simulation Program with Integrated Circuit Emphasis (SPICE) program, for example) was performed with the computer system 400. The capacitance of the capacitor 404 was set to 1500 $\mu F$, the resistance of the resistor 412 was set to seventy milliohms, the resistance of the resistor 406 was set to one milliohm, the response of the current source 402 was set to 50 A/$\mu S$, and the response of the current source 410 was set to establish a current step of 1000A/$\mu S$. Twenty-five amps was set as the minimum low current threshold level. The nominal regulated voltage level of $V_{SUPP}$ was set to 1.7 volts. The simulation showed that without the switch 29, the $V_{SUPP}$ voltage droops by 75 mV when the step in the current occurs. However, with the switch 29, the $V_{SUPP}$ voltage droops by 37 mV after the step in the current occurs. To achieve this performance without the switch 29, the capacitance of the capacitor 404 would have to be over three times greater, or 5000 $\mu F$.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A semiconductor package comprising:
    a supply voltage plane to receive a supply current from a source external to the package;
    a ground plane;
    a switch coupled between the supply voltage plane and the ground plane; and
    a die comprising:
        circuitry coupled to the supply voltage plane to receive at least a portion of the supply current; and a control unit to selectively activate the switch in response to a level of said at least a portion of the supply current to regulate a rate at which the supply current changes.

2. The semiconductor package of claim 1, wherein the switch is fabricated in the die.

3. The semiconductor package of claim 1, wherein the switch is not fabricated in the die.

4. The semiconductor package of claim 3, further comprising:
   external conducts; and
   a printed circuit board supporting the die, the printed circuit board comprising conductive lines extending between the die and the external contacts,
   wherein the switch is mounted on the board.

5. The semiconductor package of claim 1, further comprising:
   a current sensing element coupled to the voltage supply plane to sense the portion of the supply current received by the circuitry.

6. The semiconductor package of claim 5, wherein the current sensing element is fabricated on the die.

7. The semiconductor package of claim 1, further comprising:
   current sensing elements coupled to the voltage supply plane at different points of the die to sense the portion of the supply current received by the circuitry.

8. A system comprising:
   voltage regulator to provide a supply voltage and supply current, and
   a semiconductor package comprising:
      a supply voltage plane coupled to the voltage regulator to receive the supply voltage and receive a supply current;
      a ground plane;
      a switch coupled between the supply voltage plane and the ground plane; and
      a die comprising:
         circuitry coupled to the supply voltage plane to receive at least a portion of the supply current; and
         a control unit to selectively activate the switch in response to a level of said at least a portion of the supply current to regulate a rate at which the supply current changes.

9. The system claim 8, wherein the switch is fabricated in the die.

10. The system of claim 8, wherein the switch is not fabricated in the die.

11. The system of claim 10, further comprising:
    external conducts; and
    a printed circuit board supporting the die, the printed circuit board comprising conductive lines extending between the die and the external contacts,
    wherein the switch is mounted on the board.

12. The system of claim 8, further comprising:
    a current sensing element coupled to the voltage supply plane to sense the portion of the supply current received by the circuitry.

13. The system of claim 14, wherein the current sensing element is fabricated on the die.

14. The system of claim 9, further comprising:
    current sensing elements coupled to the voltage supply plane at different points of the die to sense the portion of the supply current received by the circuitry.

15. A method comprising:
    providing power to a semiconductor package, including providing a current to a voltage supply plane of the package;
    routing at least some of the current to circuitry inside the package;
    monitoring said at least some of the current; and
    based on the monitoring, selectively coupling the voltage supply plane to ground inside the package in response to a level of said at least a portion of the supply current to regulate a rate at which the supply current changes.

16. The method of claim 15, wherein the selectively coupling comprises:
    operating a switch based on a level of said at least some of the current.

17. The method of claim 15, further comprising:
    fabricating the switch in the die.

18. The method of claim 15, further comprising:
    forming the switch from a device separate from the die.

19. The method of claim 15, further comprising:
    sensing other currents at points in the die to monitor said at least a portion of the current.

20. A method comprising:
    providing a regulated voltage to a voltage supply plane of a component, the voltage causing the component to draw a current;
    monitoring the current; and
    selectively coupling the voltage supply plane to ground to regulate a rate at which the current changes.

21. The method of claim 20, wherein the selectively coupling comprises:
    coupling the voltage supply plane to the ground in response to a level of the current decreasing below a predetermined threshold.

22. The method of claim 20, wherein the rate comprises a rate at which the current decreases.

23. The method of claim 20, wherein the selectively coupling comprises:
    selectively operating a switch.

24. The method of claim 20, wherein the monitoring comprises:
    sensing other currents at different points of the component.

25. A semiconductor package comprising:
    a supply voltage plane to receive a supply current from a source external to the package;
    a ground plane;
    a switch coupled between the supply voltage plane and the ground plane; and
    a die comprising:
       circuitry coupled to the supply voltage plane to receive at least a portion of the supply current; and
       a control unit to selectively activate the switch to increase the supply current based on a level of said at least a portion of the supply current to minimize changes in the supply current.

26. The semiconductor package of claim 25, further comprising:
    a current sensing element coupled to the voltage supply plane to sense the portion of the supply current received by the circuitry.

27. The semiconductor package of claim 25, further comprising:

current sensing elements coupled to the voltage supply plane at different points of the die to sense the portion of the supply current received by the circuitry.

28. A system comprising:

voltage regulator to provide a supply voltage and supply current; and a semiconductor package comprising:
- a supply voltage plane coupled to the voltage regulator to receive the supply voltage and receive a supply current;
- a ground plane;
- a switch coupled between the supply voltage plane and the ground plane; and
- a die comprising:
    - circuitry coupled to the supply voltage plane to receive at least a portion of the supply current; and
    - a control unit to selectively activate the switch to increase the supply current based on a level of said at least a portion of the supply current to minimize changes in the supply current.

29. The system of claim 28, further comprising:

a current sensing element coupled to the voltage supply plane to sense the portion of the supply current received by the circuitry.

30. The system of claim 28, further comprising:

current sensing elements coupled to the voltage supply plane at different points of the die to sense the portion of the supply current received by the circuitry.

31. A method comprising:

providing power to a semiconductor package, including providing a current to a voltage supply plane of the package;

routing at least some of the current to circuitry inside the package;

monitoring said at least some of the current; and based on the monitoring, selectively-coupling the voltage supply plane to ground inside the package to maintain the current above a predetermined level to minimize changes in the current.

32. The method of claim 31, wherein the selectively coupling comprises:

operating a switch based on a level of said at least some of the current.

33. The method of claim 31, further comprising:

sensing other currents at points in the die to monitor said at least a portion of the current.

* * * * *